United States Patent [19]

Takeda

[11] Patent Number: 5,065,724
[45] Date of Patent: Nov. 19, 1991

[54] IGNITION TIMING CONTROL APPARATUS FOR INTERNAL COMBUSTION ENGINE

[75] Inventor: Yuji Takeda, Toyota, Japan

[73] Assignee: Toyota Jidosha Kabushiki Kaisha, Toyota, Japan

[21] Appl. No.: 562,608

[22] Filed: Aug. 3, 1990

[30] Foreign Application Priority Data

Aug. 4, 1989 [JP] Japan ................................ 1-203610

[51] Int. Cl.⁵ ............................................. F02P 5/15
[52] U.S. Cl. .................................................. 123/425
[58] Field of Search ........................... 123/425, 435; 364/431.08

[56] References Cited

U.S. PATENT DOCUMENTS

| 4,574,758 | 3/1986 | Yagley | 123/425 |
| 4,690,116 | 9/1987 | Takahashi | 123/425 |
| 4,760,828 | 8/1988 | Shimada et al. | 123/425 |

FOREIGN PATENT DOCUMENTS

| 54-147331 | 11/1979 | Japan . |
| 55-5469 | 1/1980 | Japan . |
| 56-37535 | 4/1981 | Japan . |
| 56-69532 | 6/1981 | Japan . |
| 58-53677 | 3/1983 | Japan . |
| 58-135362 | 8/1983 | Japan . |
| 58-150074 | 9/1983 | Japan . |
| 58-167880 | 10/1983 | Japan . |
| 60-256539 | 12/1985 | Japan . |
| 62-284962 | 12/1987 | Japan . |
| 63-302176 | 12/1988 | Japan . |

Primary Examiner—Tony M. Argenbright
Assistant Examiner—Robert E. Mates
Attorney, Agent, or Firm—Kenyon & Kenyon

[57] ABSTRACT

An ignition timing control apparatus including a knocking sensor, wherein when knocking occurs, the ignition timing common to all cylinders is delayed by a predetermined amount and when knocking occurs at one of the cylinders and then again at the same cylinder, the ignition timing is delayed by an amount larger than the predetermined amount.

9 Claims, 6 Drawing Sheets

IGNITION TIMING CONTROL APPARATUS FOR INTERNAL COMBUSTION ENGINE

BACKGROUND OF THE INVENTION

1. Field of the Invention

The present invention relates to an ignition timing apparatus of an internal combustion engine.

2. Description of the Related Art

Knocking is usually detected by use of a knocking sensor which generates an output voltage proportional to the strength of the vibration of a cylinder block of an engine. It is judged if knocking has occurred by detecting the strength of the vibration of the cylinder block by the knocking sensor in the range of crank angle where knocking may occur. Knocking sensors, however, also pick up vibration other than the vibration of the cylinder block generated by knocking, so it is necessary to discriminate the vibration generated by knocking from other vibration. Usually, therefore, the mean value of the output voltages of the knocking sensor or the mean value of the peak values of output voltage of the knocking sensor is deemed to be the strength of the vibration generated due to reasons other than knocking. This is used as the background noise value An. This background noise value An is multiplied by a certain coefficient K (K>1.0). The result is used as the knocking judgement value An·K. When the output voltage of the knocking sensor exceeds the knocking judgement value An·K, it is judged that knocking has occurred. When it is judged that knocking has occurred, a common ignition timing for all cylinders is delayed by a certain predetermined angle. Note that the background noise value An differs for each cylinder, so different background noise values are given to the cylinders.

As mentioned above, however, the background noise value An is the mean value of the output voltages of the knocking sensor or the mean value of the peak values of the output voltages of the knocking sensor, so if knocking occurs a number of times in a certain specific cylinder, for example, the no. 1 cylinder, the background noise value An of the no. 1 cylinder gradually becomes larger. If the background noise value An becomes gradually larger in this way, however, even if knocking actually occurs in the no. 1 cylinder, it is judged that no knocking has occurred and therefore no delay is given to the ignition timing, so there is the problem that knocking will continue.

To resolve the above problem, it has been considered to find the frequency of occurrence of knocking for each cylinder and to greatly delay the ignition timing when the largest frequency among these exceeds a certain value. It takes time, however, to find the frequency of occurrence of knocking in this way and therefore the delay action on the ignition timing is too slow during transitional engine operations, so the problem of frequent knocking remains.

SUMMARY OF THE INVENTION

The present invention provides an ignition timing control apparatus which enables prevention of knocking in an excellent manner even during transitional engine operations.

According to the present invention, there is provided an ignition timing control apparatus of an engine having a plurality of cylinders, provided with a detection means for detecting the intensity of vibration of the engine in ranges of crank angles predetermined for the cylinders; a calculation means for calculating for each cylinder a knocking judgement value serving as a criteria for judgement if knocking has occurred based on the intensity of the vibration of the engine in the predetermined crank angle ranges; a judgement means for judging, when the intensity of the vibration of the engine in the predetermined crank angle ranges exceeds the knocking judgement value, if knocking has occurred at the corresponding cylinders; an ignition timing control means for delaying by a predetermined delay the common ignition timing of all cylinders; and a delay increase means for increasing the delay when it is judged that knocking has occurred at one of the cylinders, then it is judged that knocking has occurred again at the same cylinder without judgement that knocking has occurred at another cylinder.

The present invention may be more fully understood from the description of the preferred embodiments of the invention set forth below, together with the accompanying drawings.

DESCRIPTION OF THE PREFERRED EMBODIMENTS

Figure 1:
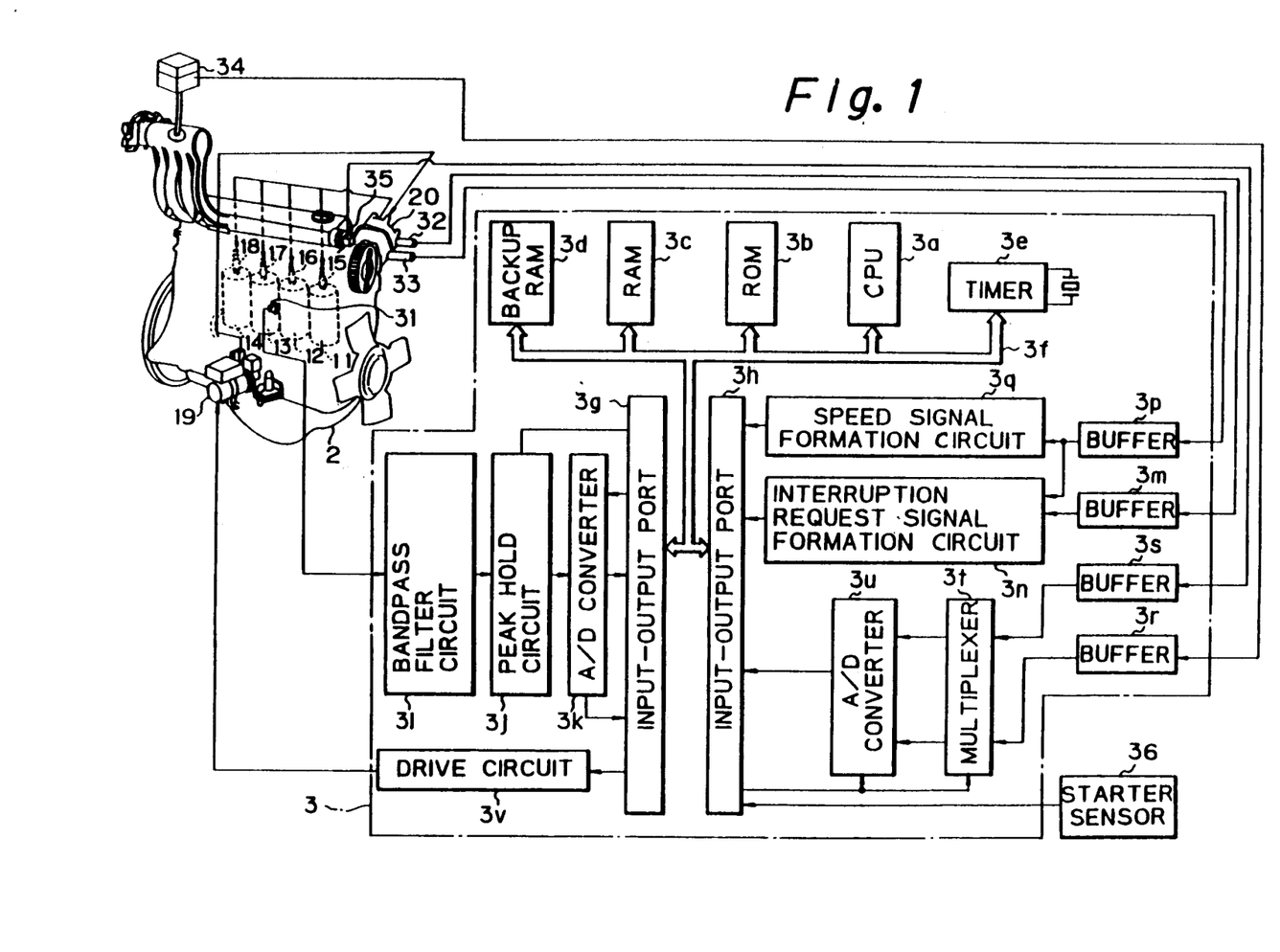
FIG. 1 is an overview of the ignition timing control apparatus.

Referring to FIG. 1, the engine 2 includes four cylinders from the no. 1 to no. 4 cylinders 11, 12, 13, and 14, each cylinder being provided with a spark plug 15, 16, 17, and 18. These spark plugs 15, 16, 17, and 18 are supplied with the high voltage required for ignition, generated by an ignitor 19 provided with an ignition coil, by a distributor 20 provided with a camshafts which is linked with a crankshaft (not shown).

The ignition timing control apparatus of the engine of the embodiment is provided with various sensors, as mentioned below, for detecting the operating state of the engine 2. The knocking sensor 31 mounted on the cylinder block of the engine 2 converts mechanical vibration generated by the engine 2 into electrical signals and outputs the signals. Since the knocking sensor 31 must detect with a high precision the mechanical vibration of the engine 2 occurring due to knocking, the sensor employs a known resonance type which resonates at the knocking frequency. The distributor 20 includes a cylinder discrimination sensor 32 and rotational speed sensor 33, the cylinder discrimination sensor 32 generating a cylinder discrimination signal with each quarter turn of the camshaft of the distributor 20, that is, 180° CA, while the rotational speed sensor 33 generating a rotational speed signal with each 1/24th rotation of the camshaft, that is, 30° CA crank angle. Also, provision is made of an intake pipe pressure sensor 34 which measures the intake pipe pressure in an intake manifold, a water temperature sensor 35 which measures the engine temperature from the cooling water temperature of the engine 2, and a start sensor which detects the operating state of an engine starter (not shown).

The sensor signals of the above sensors are input to an electronic control unit (hereinafter referred to as an ECU) used as feedback information necessary for control of the engine 2. As illustrated, the ECU 3 is constituted by a digital computer and is provided with a known CPU 3a, ROM 3b, RAM 3c, backup RAM 3d, and timer 3e. These are connected to input-output ports 3g and 3h through a common bus 3f.

Further, the ECU 3 matches with the impedance of the various external equipment and coordinates the timing of reception of information with the following circuits. First, a bandpass filter circuit 3i connected to a first stage of the output of the knock sensor 31 performs impedance matching and has transitional region characteristics at the frequency band unique to knocking (in general, 6 to 8 kHz). The output of the bandpass filter circuit 3i is input to a peak hold circuit 3j, where the maximum amplitude of the knocking signal passing through the bandpass filter circuit 3i is held in accordance with a control signal of the CPU 3a. Further, an A/D converter 3k is connected between the peak hold circuit 3j and input-output port 3g and an A/D conversion end interruption signal is output to the CPU 3a. The cylinder discrimination signal output by the cylinder discrimination sensor 32 is input through a buffer 3m and interruption request signal formation circuit 3n from the input-output port 3h to the CPU 3a, the rotational speed signal output by the rotational speed sensor 33 through a buffer 3p, interruption request signal formation circuit 3n, and speed signal formation circuit 3q, and the operating state of the starter detected by the starter sensor 36 directly. Further, the detection signal of the intake pipe pressure sensor 34 is input to a buffer 3r and the detection signal of the water temperature sensor 35 to a buffer 3s, then are input through a multiplexer 3t and A/D converter 3u operating in accordance with control signals of the CPU 3a, from the input-output port 3h to the CPU 3a.

On the other hand, the CPU 3a outputs control signals through an input-output port 3g to a drive circuit 3v to drive the ignitor 19 and control the ignition timing.

Figure 2:
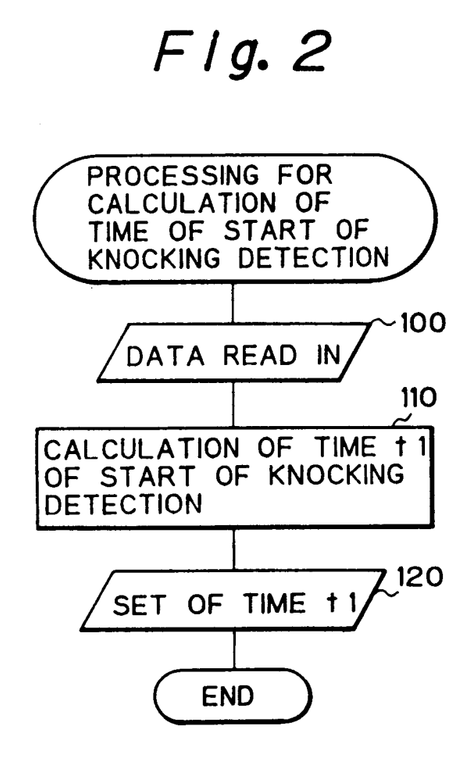
FIG. 2 is a flow chart for the calculation of the timing of the start of knocking detection.

Next, an explanation will be made of the processing for control of the ignition timing executed by the ECU 3 based on the various following flow charts. First, an explanation will be made of the processing for calculation of the time of start of detection of knocking based on the flow chart shown in FIG. 2. This processing for calculation of the time of start of detection of knocking is executed by the CPU 3a when an interruption signal, generated at each specific predetermined crank angle (in this embodiment, top dead center point (TDC)) is input to the ECU 3. First, to detect the operating state of the engine 2 at the current time, at step 100, processing is performed for reading in the output data of the various sensors. Next, at step 110, processing is performed for calculating the knocking detection start time t1 based on the various data read in. Here, the knocking detection start time t1 is calculated based on the starting crank angle of the predetermined knocking detection period (for example, ATDC 10 to 20° CA) and the current crank angle CA$\theta$° CA detected and also the current time TM of the timer 3e and gives the time of the start of execution of the later mentioned peak hold processing. Next, at step 120, this knocking detection start time t1 is set in a predetermined register in the CPU 3a storing the time for generating an interruption signal and the processing for calculating the time of start of knocking detection is ended. After this, the processing for calculation of the start of knocking detection is repeatedly executed every specific crank angle.

Figure 3:
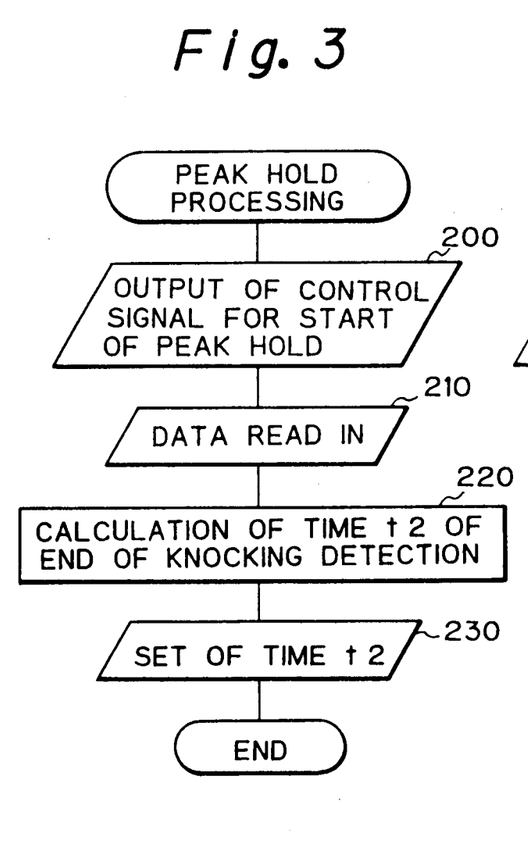
FIG. 3 is a flow chart for the execution of peak hold processing.

Next, an explanation will be made of the peak hold processing based on the flow chart of FIG. 3. Peak hold processing is executed by the CPU 3a when an interruption signal generated at the above mentioned knocking detection start time t1 is generated. When the processing starts, first, at step 200, processing is performed for outputting a control signal of a high level ("1") to a peak hold circuit 3j, and a peak hold operation of a knocking signal input to the peak hold circuit 3j is started. Next, at step 210, processing is performed for reading in various types of data on the engine 2 and then, at step 220, the time t2 of the end of the knocking detection is calculated based on the information. Here, the knocking detection end time t2 is calculated based on the crank angle from the start to the end of the predetermined knocking detection period (in this embodiment, for example 60 to 90° CA), the detected current crank angle C$\theta$° CA, and the current time TM of the timer 3e and gives the time of the start of execution of the processing for starting the A/D conversion, mentioned later. Next, at step 230, the time t2 of the end of the knocking detection calculated here is set in a register in the CPU 3a and the processing for calculating the end of the knocking detection is ended. After this, the processing for calculating the end of the knocking detection is repeatedly executed with every generation of an interruption signal.

Figure 4:
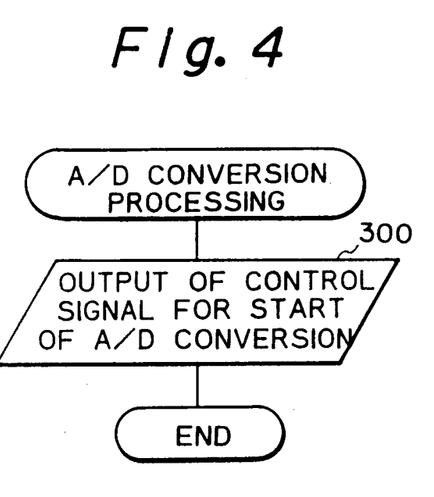
FIG. 4 is a flow chart for the execution of A/D conversion processing.

Next, an explanation will be given of the A/D conversion processing based on the flow chart of FIG. 4. This A/D conversion processing is executed by an interruption signal generated at the time t2 of the end of knocking detection. When the processing starts, at step 300, processing is performed for output a control signal of a high level ("1") to the A/D conversion circuit 3k and the A/D conversion of knocking signals input to the A/D conversion circuit 3k is started. After the end of this conversion processing, the A/D conversion processing ends. After that, this A/D conversion processing is repeatedly executed with each generation of an interruption signal.

Figure 5:
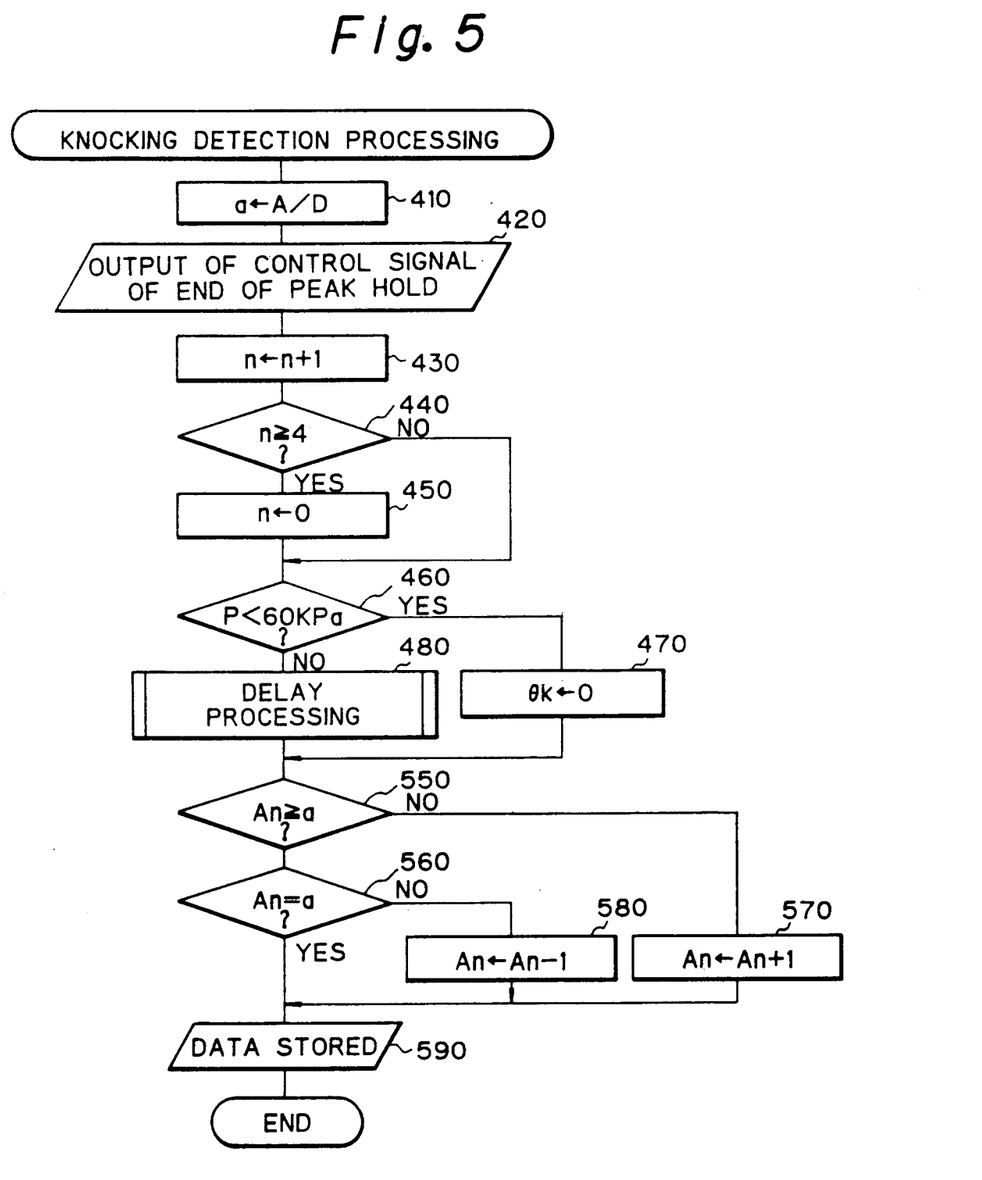
FIG. 5 is a flow chart for the execution of knocking detection processing.

With reference to FIG. 5, at step 410, the A/D converted value of the knocking signal obtained from the A/D convertor 3k is made the variable a (hereinafter referred to as the knocking signal value). Next, at step 420, a peak hold end control signal (low level ("0") is output to the peak hold circuit 3j, then preparation is made for the next peak hold operation.

Next, at step 430, the variable n for the cylinder discrimination is incremented by "1" and then at step 440, it is judged if the variable n has become a value of "4" or more. Only when $n \geq 4$, the control proceeds to step 450 and "0" is again set for the variable n. That is, due to the series of processing from step 430 to 450, the variable n cyclically takes the values of 0, 1, 2, and 3. Note that the value of the variable n and the cylinder number of the engine 2 do not have a direct relationship with each other. The two may match or not match and there is still no obstruction to the control of the ignition timing in any way, as explained below.

When the variable n corresponding to the currently processed cylinder is determined, next, at step 460, it is judged if the operating state of the engine 2 is in the region of occurrence of knocking. This is judged by whether the intake pipe pressure P detected by the intake pipe pressure sensor 34 is over the pressure 60 kPa. If it is judged that P<60 kPa, it is judged that the region is not one where knocking occurs and the control proceeds to step 470, where the knocking suppression delay $\theta K$ is made "0". This delay $\theta K$ is used in the ignition timing control routine not shown when calculating the common ignition timing $\theta$ for all the cylinders. For example, the ignition timing $\theta$ in the ignition timing control routine is calculated by the following equation (1).

$$\theta = \theta B - \theta K + \theta H \tag{1}$$

where, $\theta B$ . . . basic ignition timing calculated based on the engine load and rotational speed $\theta H$ . . . other correction values Therefore, the delay $\theta K$ is reflected in the ignition timing $\theta$ control of the engine 2. For example, when the value "0" is set for the delay $\theta K$, the ignition timing of the engine 2 is not delayed or advanced in angle by the knocking control.

On the other hand, if the intake pipe pressure P is 60 kPa or more, it is judged that the region is one where knocking occurs and the control proceeds to step 480 where angle delay processing is performed. This angle delay processing is one which increases the delay $\theta K$ by a value of the angle delay X multiplied by an increase correction value e each time it is judged that knocking occurs, as shown in the flow chart of FIG. 6.

Figure 6:
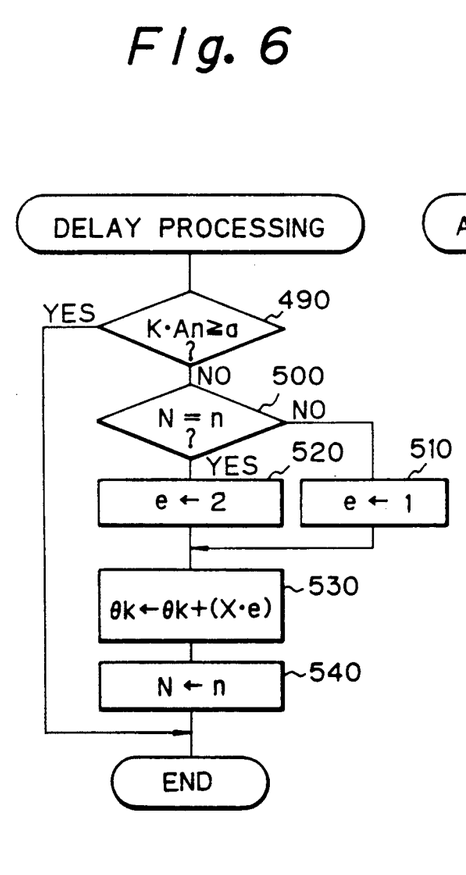
FIG. 6 is a flow chart for the execution of angle delay processing.

That is, in the angle delay processing, first, at step 490, it is judged if knocking is currently occurring by the following equation (2):

$$K \times An \geq a \tag{2}$$

where,

K . . . variable (K>1.0) calculated based on engine rotational speed, load, water temperature, etc.

An . . . background noise value of currently processed cylinder a . . . knock signal value Here, when it is judged that the knock signal value a is no more than the product of the variable K and the background noise value An, i.e., the knocking judgement value K×An, it is judged that no knocking is currently occurring and the angle delay routine of FIG. 6 is ended once.

On the other hand, when the knocking signal value a is larger than the knocking judgement value K×An, it is judged that knocking is currently occurring and, at steps 500, 510, and 520, the amounts of increment of the delay $\theta K$ (X·e) are determined. That is, first, at step 500, it is judged if the variable n for the current cylinder discrimination and the variable N for the previous cylinder determination are the same, whereby it is judged if the cylinder in which knocking currently occurs and the cylinder in which knocking previously occurred are the same.

Next, if the cylinder where knocking currently occurs is not the same as the previous one, the control proceeds to step 510, where the increase correction value e is made the value "1". On the other hand, if the cylinder in which knocking currently occurs is the same as the previous one, the control proceeds to step 520, where the increase correction value e is made "2".

By this, the amount (X·e) of increase of the delay $\theta K$ becomes twice the amount (X·e) of increase when the cylinder in which knocking is currently occurring is the same as the cylinder in which knocking previously occurred as in the case where the cylinders are different. Note that X is a predetermined amount.

Next, at step 530, processing is performed to add the increase (X·e) to the delay $\theta K$ and make the new delay $\theta K$, then, at step 540, processing is performed for replacing the variable n for discrimination of the current cylinder for the variable N for discrimination of the previous cylinder and the angle delay processing routine is ended once.

As mentioned above, by the processing from steps 490 to 540, when the current knocking occurs in a cylinder different from the previous knocking, the ignition timing is delayed by a delay X (for example, 1° CA per each knocking), while when the current knocking occurs in the same cylinder as the previous knocking, the ignition timing is delayed by a value of twice the delay X (for example, 2° CA per knocking).

After the delay processing (step 480 in FIG. 5) shown in FIG. 6 is ended, processing is performed for revision of the background noise value shown in step 550 on.

That is, at steps 550 and 560, a judgement is made as to the size relationship of the currently detected knocking signal value a and the knocking background noise value An for the currently processed cylinder and if An<a, the control proceeds to step 570, where the background noise value An is incremented, while if An>a, the control proceeds to step 580, where An is decremented and if An=a, An is held as is. After this, at step 590, this background noise value An is stored in a predetermined storage region for the currently processed cylinder and the routine is ended once.

By the knocking detection processing of FIG. 5, the detection of knocking of the engine 2 and the delay processing of the ignition timing during occurrence of knocking are performed.

Next, an explanation will be made of the angle advance processing of the ignition timing based on the flow chart of FIG. 7. This angle advance processing is executed by the CPU 3a with each 4 ms. When the processing is started, for the first time, at step 600, processing is performed for incrementing a 500 ms counter C500. Next, at step 610, it is judged if the 500 ms counter C500 is above a value "125". Here, if the 500 ms counter C500 does not reach the value "125", the control proceeds to step 660, while if it does reach the value "125", that is, every 500 ms, first, at step 620, the 500 ms counter C500 is cleared and then, at step 630, processing is performed for calculating the predetermined decrement value Y from the delay $\theta K$. After the decrement value Y is subtracted from the delay $\theta K$, at step 640, it is judged if the delay $\theta K$ is "0" or above. If less than "0", the control proceeds to step 650 and the value "0" is set for the delay $\theta K$, while if "0" or above, the control proceeds to step 660, where the delay $\theta K$ is stored in a predetermined storage region and the routine is once ended.

Figure 7:
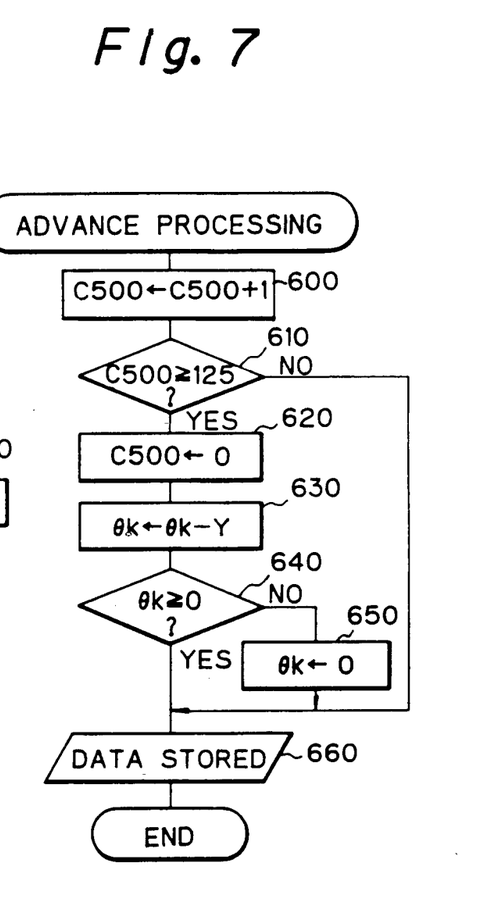
FIG. 7 is a flow chart for the execution of angle advance processing.

Above, by the advance processing shown in FIG. 7, the ignition timing is advanced by exactly an angle corresponding to a decrement value Y (for example, 1° CA) every 500 ms.

According to the ignition timing control of the first embodiment explained based on the flow charts from FIG. 5 to FIG. 7, when the cylinder in which the knocking currently occurs and the cylinder in which knocking previously occurred are the same, the ignition timing is delayed immediately by twice the delay of the ignition timing in the case where these cylinders differ.

Therefore, if knocking occurs frequently in the same cylinder, the ignition timing is immediately greatly delayed, so knocking can be prevented from occurring. As a result, the background noise value An for the same cylinder is prevented from abnormally increasing. Explained another way, the background noise value An is prevented from abnormally increasing, so the occurrence of knocking can be reliably detected and therefore the ignition timing can be delayed and the occurrence of knocking prevented.

Further, in a multiple cylinder internal combustion engine, in general, there are cylinders in which knocking easily occurs and cylinders in which knocking does not easily occur. Knocking tends to occur consecutively in cylinders in which knocking easily occurs. However, in the present invention, when knocking occurs consecutively in the same cylinder, the ignition timing is immediately greatly delayed, so even in a transitional operating state of the engine, knocking can be prevented from occurring very well.

Further, in the first embodiment, when, for example, knocking occurs in the no. 1 cylinder and then knocking occurs again in the no. 1 cylinder without having occurred first in another cylinder, the ignition timing is delayed by 2° CA. As opposed to this, when knocking occurs in the no. 1 cylinder, then knocking occurs in another cylinder, and then once again knocking occurs in the no. 1 cylinder, the ignition timing is advanced only 1° CA. This is because when knocking occurs in another cylinder, the ignition timing has already been delayed by 1° CA, so if the ignition timing were to be delayed by 2° CA when knocking again occurred in the no. 1 cylinder, this would be an over advance.

Figure 8:
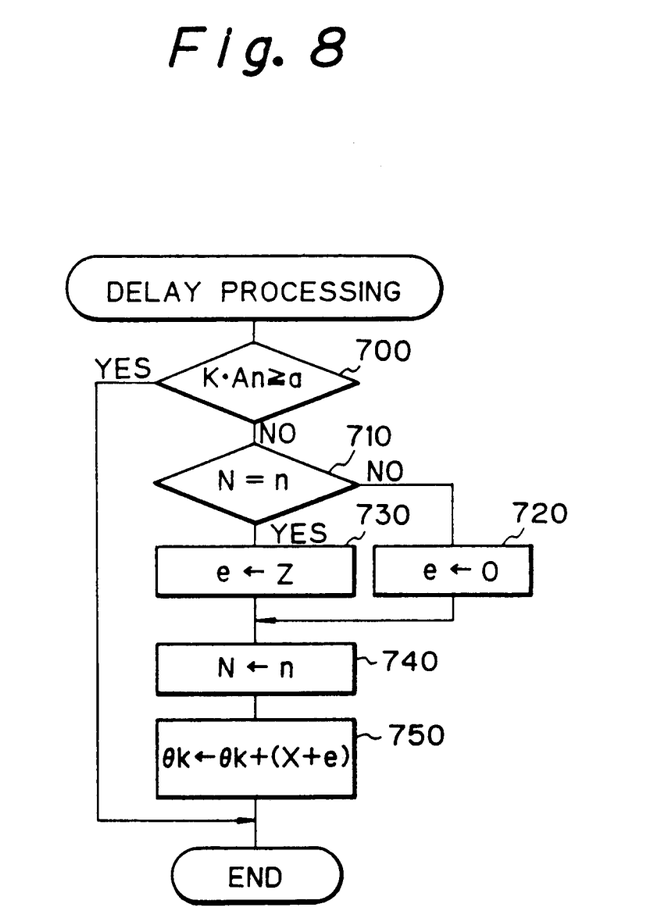
FIG. 8 is a flow chart of another embodiment of execution of angle delay processing.

Note that delay control may be performed based on the flow chart of FIG. 8 instead of the flow chart of the delay processing routine of FIG. 6 in the first embodiment.

In the delay processing routine of FIG. 8, first, at step 700, it is judged in accordance with the already mentioned equation (2) if knocking is currently occurring. If it is judged that knocking is currently occurring, then, at step 710, it is judged if the cylinder in which the current knocking occurred and the cylinder in which the previous knocking occurred are the same (N=n) or not (N≠n). If the cylinders where knocking currently and previously occurred differ (N≠n), then the control proceeds to step 720 and the value "0" is set for the increase correction value e, while if the cylinders where knocking currently and previously occurred are the same (N=n), the control proceeds to step 730 and the value "Z" (Z>0) is set for the increase correction value e.

After the value "0" or "Z" is set for the increase correction value e, at step 740, the variable n for discrimination of the current cylinder is made the variable N and then, at step 750, processing is performed so that the delay X and the increase correction e are added to the delay amount $\theta K$ and so that $(\theta K+(x+e))$ is made the delay $\theta K$.

By this, when knocking occurs consecutively in the same cylinder, the ignition timing is delayed by the amount corresponding to the value "Z" more than in the case when knocking occurs in different cylinders.

Note that in the delay processing routine shown in FIG. 8, in the case where knocking occurs consecutively in the same cylinder, the value "Z" replaced by the increase correction e is made the variable and the value replacing the value "Z" is made the engine rotational speed, the throttle opening degree, or other variable. That is, when knocking occurs consecutively, control for increasing the increase of the delay the higher the load may be performed simply by just changing the value "Z".

Next, an explanation will be given of a third embodiment based on the flow chart of the delay processing routine of FIG. 9. This third embodiment is one in which delay control is performed based on the flow chart of FIG. 9 instead of the delay processing of FIG. 6 in the first embodiment.

Figure 9:
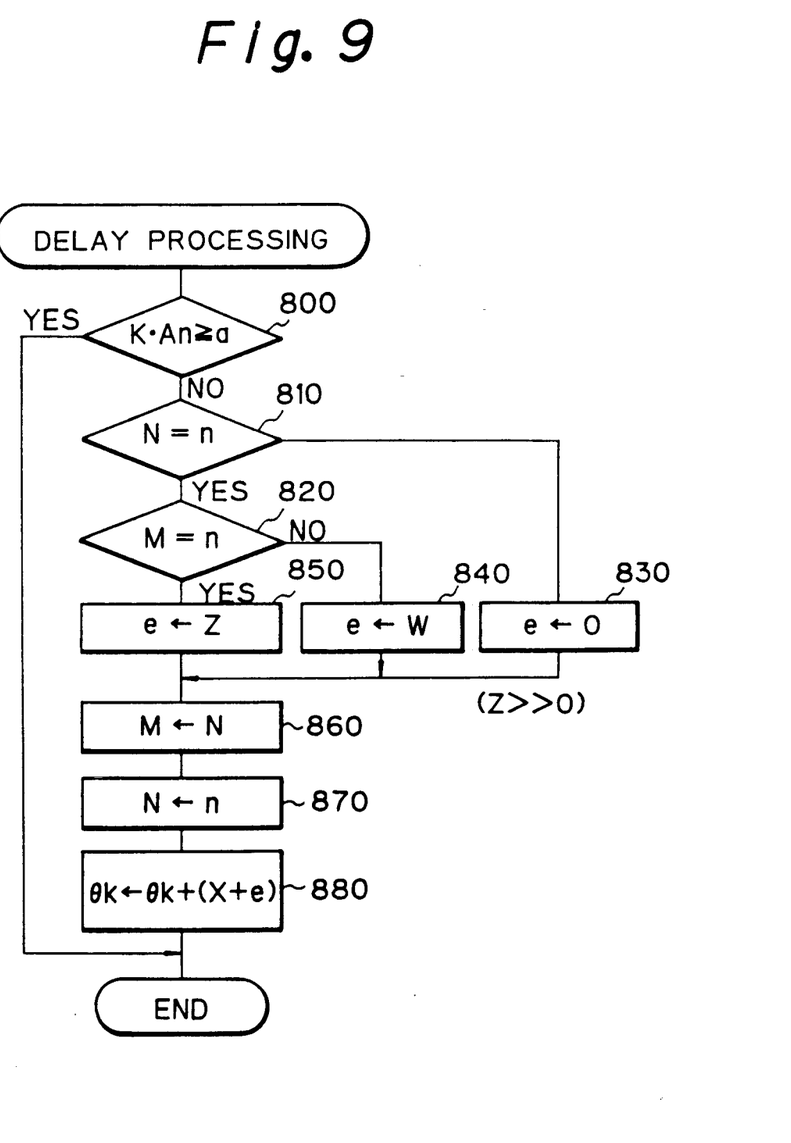
FIG. 9 is a flow chart of another embodiment for execution of angle delay processing.

When the delay processing routine of FIG. 9 is started, the first, at step 800, it is judged in accordance with equation (2), mentioned already in reference to the first embodiment, if knocking is currently occurring. If it is judged here that knocking is not currently occurring, the routine is ended once. On the other hand, if it is judged that knocking is currently occurring, then at steps 810 and 820, a comparison is made of the variable n for discrimination of the current cylinder, the variable N for discrimination of the previous cylinder, and the variable M for discrimination of the cylinder before the previous cylinder, whereby it is judged if the cylinder in which knocking currently occurs and the cylinder in which knocking previously occurred are the same and if the cylinder in which knocking currently occurred and the cylinder in which knocking occurred one time before the previous time are the same.

After the judgement on the state of consecutiveness of the knocking cylinders, the increase correction e is set as follows in accordance with that judgement.

That is, when the cylinders generating the knocking currently and previously differ, the control passes on to step 830, where the value "0" is substituted for the increase correction e. If the cylinders generating the knocking currently and previously are the same, the control passes on to step 840 and the value "W" (W>0) is substituted for the increase correction value e. If the cylinders generating the knocking currently, previously, and one time before previously are all the same, the control proceeds to step 850 where the value "Z" (Z>W>0) is substituted for the correction value e.

By this, if the number of times the same cylinder generates knocking consecutively increases, a large value is set for the increase correction e.

After setting the increase correction e, at step 860, the variable N for discrimination of the previous cylinder is substituted for the variable M for discrimination of the cylinder one time before the previous time, then at step 870, the variable n for discriminating the current cylinder is substituted for the variable N for discrimination of the previous cylinder, then at step 880, processing is performed for adding the delay X and the increase correction e to the delay $\theta K$ and making this the new knocking correction $\theta K$, whereupon the routine is once ended.

In the ignition timing control of the third embodiment explained above, when the cylinder in which knocking currently occurred and the previous cylinder differ, the ignition timing is delayed by the delay X (for example, 1° CA per knocking). When these cylinders are the same, the ignition timing is delayed by the delay X plus the value "W" (for example, 2° CA per single knocking). Further, when the cylinder in which knocking currently occurred is the cylinder in which knocking occurred previously and the time before that too, the ignition timing is delayed by the delay X plus the large value "Z" (Z>W>0) (for example, 4° CA per knocking).

Therefore, by delaying the ignition timing more than usual (for example, two-fold) when knocking occurs consecutively at the same cylinder, it is possible to prevent frequent occurrence of knocking in the same cylinder and also when knocking concentrates particularly at the same cylinder, the ignition timing is delayed even further (for example, four-fold) and it is possible to strongly suppress occurrence of knocking.

In the third embodiment, even when the frequency of occurrence of knocking of the same cylinder becomes high, it is possible to effectively prevent the increase of the background noise value An and therefore it is possible to effectively prevent the occurrence of knocking.

While the invention has been described by reference to specific embodiments chosen for the purpose of illustration, it should be apparent that numerous modifications could be made thereto by those skilled in the art without departing from the basic concept and scope of the invention.

I claim:

1. An ignition timing control apparatus of an engine having a plurality of cylinders, comprising
   detection means for detecting the intensity of vibration of the engine in ranges of crank angles predetermined for the cylinders;
   calculation means for calculating for each cylinder a knocking judgement value serving as a criteria for judgement if knocking has occurred based on the intensity of the vibration of the engine in the said predetermined crank angle ranges;
   judgement means for judging, when the intensity of the vibration of the engine in the predetermined crank angle ranges exceeds said knocking judgement value, if knocking has occurred at the corresponding cylinders;
   ignition timing control means for delaying by a predetermined delay the common ignition timing of all cylinders when knocking has occured; and
   delay increase means for increasing the delay when it is judged that knocking has occurred at one of the cylinders, then it is judged that knocking has occurred again at the same cylinder without judgement that knocking has occurred at another cylinder.

2. An ignition timing control apparatus as set forth in claim 1, wherein said detection means is comprised of a single knocking sensor mounted on the engine.

3. An ignition timing control apparatus as set forth in claim 1, wherein the knocking judgement value is expressed by the product of a background noise value An and a coefficient K and said calculation means makes the background noise value An equal to a peak value of intensity of vibration of the engine in the predetermined crank angle range.

4. An ignition timing control apparatus as set forth in claim 3, wherein when the peak value of vibration of the engine in the predetermined crank angle range exceeds the said knocking judgement value, it is judged that knocking occurred in the corresponding cylinder.

5. An ignition timing control apparatus as set forth in claim 1, wherein the delay increased by the delay increase means is equal to the predetermined delay.

6. An ignition timing control apparatus as set forth in claim 1, wherein the delay increased by the delay increase means is changed in accordance with the operating state of the engine.

7. An ignition timing control apparatus as set forth in claim 1, wherein the delay increase means can further increase the delay when, after knocking has occurred at one cylinder twice, knocking occurs a third time in the same cylinder without a judgement of occurrence of knocking at another cylinder.

8. An ignition timing control apparatus as set forth in claim 1, wherein provision is made of an ignition timing advance means for gradually advancing the ignition timing until the delay becomes zero.

9. An ignition timing control apparatus as set forth in claim 1, wherein provision is made of a pressure sensor for sensing a pressure in an intake pipe of the engine and, when it is judged that the pressure in the intake pipe is above a predetermined pressure and knocking has occurred, said ignition timing control means delays the ignition timing.

* * * * *